United States Patent
Wang et al.

(10) Patent No.: US 8,255,201 B2
(45) Date of Patent: Aug. 28, 2012

(54) FULL-SYSTEM ISA EMULATING SYSTEM AND PROCESS RECOGNITION METHOD

(75) Inventors: Hua Yong Wang, Beijing (CN); Kun Wang, Beijing (CN); Honesty Young, Saratoga, CA (US)

(73) Assignee: International Business Machines Corporation, Armonk, NY (US)

(*) Notice: Subject to any disclaimer, the term of this patent is extended or adjusted under 35 U.S.C. 154(b) by 1162 days.

(21) Appl. No.: 12/107,835

(22) Filed: Apr. 23, 2008

(65) Prior Publication Data

US 2008/0270740 A1    Oct. 30, 2008

(30) Foreign Application Priority Data

Apr. 25, 2007  (CN) .......................... 2007 1 0104743

(51) Int. Cl.
   *G06F 9/455* (2006.01)
(52) U.S. Cl. .......... 703/23; 717/136; 712/227; 711/216
(58) Field of Classification Search .................. 703/22, 703/23; 717/136, 139; 707/100; 712/226, 712/227, 229, 13; 714/38; 711/159, 154, 711/207, 216, 203; 710/100; 719/319; 718/102; 709/1, 23; 713/1; 380/246
   See application file for complete search history.

(56) References Cited

U.S. PATENT DOCUMENTS

| | | | |
|---|---|---|---|
| 5,598,473 A * | 1/1997 | Linsker et al. ................. | 380/246 |
| 6,886,085 B1 * | 4/2005 | Shuf et al. ..................... | 711/159 |
| 7,386,669 B2 | 6/2008 | Dombrowski et al. | |
| 7,418,584 B1 * | 8/2008 | Klaiber et al. ................. | 712/229 |
| 7,644,210 B1 * | 1/2010 | Banning et al. ................ | 710/100 |
| 7,734,895 B1 * | 6/2010 | Agarwal et al. ................ | 712/13 |
| 7,836,121 B2 * | 11/2010 | Elgressy et al. ............... | 709/203 |
| 2003/0037089 A1 * | 2/2003 | Cota-Robles et al. ............ | 709/1 |
| 2004/0003324 A1 * | 1/2004 | Uhlig et al. ..................... | 714/38 |

(Continued)

FOREIGN PATENT DOCUMENTS

WO    WO2005008479 A2    1/2005

(Continued)

OTHER PUBLICATIONS

Zmily,Ahmad, Improving Instruction Delivery with a Block-Aware ISA, J.C. Cunha and P.D. Medeiros (Eds.): Euro-Par 2005, LNCS 3648, pp. 530-539, 2005. c.Springer-Verlag Berlin.

*Primary Examiner* — Kandasamy Thangavelu
(74) *Attorney, Agent, or Firm* — Vazken Alexanian (57) ABSTRACT

Disclosed is a method of recognizing a process in a full-system Instruction Set Architecture (ISA) emulator, comprising the steps of: recognizing a process based on a base address of a page table thereof, recognizing the switch between the processes when said base address of the page table has changed, recognizing the termination of a recorded process when the base address of the page table of the process which tries to modify the page table is not equal to the base address of the page table of the recorded process in the page table. With the recognized process, the binary translation results indexed based on content can be saved into a corresponding process repository, thereby achieving the permanent saving of the translation results and the reuse of translation and optimization on the basis of a previously executed program. Consequently, the overall performance of the full-system Industry Standard Architecture emulator is enhanced.

8 Claims, 7 Drawing Sheets

U.S. PATENT DOCUMENTS

| | | |
|---|---|---|
| 2004/0221278 A1 | 11/2004 | Dankel et al. |
| 2004/0225869 A1* | 11/2004 | Pagni et al. .................. 712/227 |
| 2005/0071823 A1* | 3/2005 | Lin et al. ...................... 717/136 |
| 2005/0086650 A1* | 4/2005 | Yates et al. .................... 717/139 |
| 2006/0117169 A1* | 6/2006 | Peinado et al. ................... 713/1 |
| 2006/0265557 A1* | 11/2006 | Peinado et al. ............... 711/154 |
| 2007/0006178 A1* | 1/2007 | Tan ................................ 717/136 |
| 2007/0061548 A1* | 3/2007 | Jordan et al. .................. 711/207 |
| 2007/0079106 A1* | 4/2007 | Davis ............................. 711/203 |
| 2007/0106990 A1* | 5/2007 | Kissell ........................... 718/102 |
| 2008/0077767 A1* | 3/2008 | Khosravi et al. .............. 711/216 |
| 2008/0141011 A1* | 6/2008 | Zhang et al. ................... 712/226 |
| 2008/0177756 A1* | 7/2008 | Kosche et al. ................. 707/100 |
| 2009/0320048 A1* | 12/2009 | Watt et al. ...................... 719/319 |

FOREIGN PATENT DOCUMENTS

| | | |
|---|---|---|
| WO | WO2005008487 A2 | 1/2005 |
| WO | WO2005008487 A3 | 1/2005 |

* cited by examiner

FULL-SYSTEM ISA EMULATING SYSTEM AND PROCESS RECOGNITION METHOD

This application claims priority under 35 U.S.C. §119 from Chinese Patent Application No. 200710104743.3 filed Apr. 25, 2007, the entire contents of which are incorporated herein by reference.

FIELD OF THE INVENTION

The invention generally relates to a full-system Instruction Set Architecture (ISA) emulating system and more particularly, to process recognition in the full-system ISA emulating system.

BACKGROUND OF THE INVENTION

A full-system ISA emulator is a tool which supports running operating systems and applications of one ISA platform on another ISA platform, for example, running x86 Linux and corresponding applications on a PowerPC machine. It is an important method to extend the usage of an existing platform, to migrate servers between different ISA platforms, to develop and debug software of a pre-hardware system on an existing platform, etc.

Currently, full-system ISA emulators can be categorized into two classes: 1) interpretation-based ones, which sequentially interpret and emulate each instruction of a target ISA on a host platform, and; 2) binary-translation-based ones, which when encountering a section of non-translated target binary codes, translate them to host binary codes, then store the translated codes into the translation cache, and finally execute the translated codes directly. Usually the binary-translation-based emulators achieve higher performance than the interpretation-based ones, since they interpret and emulate many target instructions in a batch, instead of only one instruction each time.

Typically, binary-translation-based emulators check if a section of target binary codes has been translated in the following way: 1) calculating the starting physical address of the target binary codes, and; 2) searching the translation cache for the address. If found it means the code section has already been translated. Therefore, the translation results are indexed by the physical address of target binary codes. Since the physical address of binary codes may change after the program exists and re-executes, the translation results cannot be stored in permanent media, such as a hard-disk. So in the case of cache replacement, current binary-translation-based emulators have to discard some translated codes, and re-translate them when encountering them again. Another common way to improve the performance of an emulator is to dynamically optimize the translated codes based on, for example, profiling. The optimized codes cannot be saved in the permanent media due to the above-mentioned reason about index by physical address. Since both optimization and translation are time consuming, re-translating and re-optimizing the codes will degrade the overall performance of an emulator.

Consequently, there is a need for a new way to index the translation results and to store the translation results in the permanent media in this way. It is known that the code page of a program is the only part which needs to be translated and optimized. That is to say, the code page of a program is the unique feature thereof. If the content of the code page can be used, i.e., translation and optimization results can be indexed based on the content, then these translation results can be stored in the permanent media.

Although the translation results can be stored permanently using the aforesaid idea, since all applications in a full-system ISA emulator are run on an emulated OS (operating system) instead of the emulator directly, the full-system ISA emulator can only see the instruction flows, the machine states, and the memory mapping, but cannot differentiate different programs and recognize separate processes. Since the processes cannot be recognized separately by the full-system ISA emulator, even though the translation results indexed by content are stored permanently using the aforesaid idea, they can only be put into a huge translation repository instead of many application-dedicated process repositories. Obviously, since the process cannot be recognized, the full-system ISA emulator will look up the stored translation results in the huge translation repository, which is time-consuming. And maintenance of a huge translation repository results in much more overhead and cost than a small process repository.

Additionally, full-system ISA emulators are also often used to generate the profiling data for applications. However, full-system ISA emulators can hardly generate the profiling data dedicated for target applications without interleaving of other concurrent applications, since they cannot recognize the processes separately.

Therefore, there is a need for a method of recognizing a process in a full-system ISA emulator and saving the content-based dynamic binary translation in the full-system ISA emulator by the recognized process.

SUMMARY OF THE INVENTION

It is an object of the present invention to recognize a process in a full-system ISA emulator and save the content-based dynamic binary translation results by the recognized process.

To achieve the above object, the present invention provides a method of recognizing a process in a full-system ISA emulator, comprising the steps of: recognizing a process based on a base address of page table of the process; recognizing the switch between processes when said base address of page table changes; and recognizing the termination of a recorded process when the base address of a page table of a process which tries to modify the page table is not equal to the base address of the page table of the recorded process in the page table.

The present invention also proposes saving, by an emulator, of content-based dynamic binary translation based on the recognized process, the saving comprising the steps of: calculating the digestion of a code page; and looking up a process repository of the code page to determine whether it has been translated based on the digestion; if the code page has not been translated, then said emulator translates the code page and saves the translation results in the process repository.

The present invention also provides a full-system ISA emulating system, comprising: process recognition means for recognizing a process based on the base address of a page table of the process, recognizing the switch between processes when the base address of a page table changes, and recognizing the termination of a recorded process when the base address of a page table of a process which tries to modify a page table is not equal to the base address of the page table of the recorded process in the page table; translation code lookup means for calculating the digestion of a code page, and looking up a process repository of the code page to determine whether it has been translated based on the digestion; and translation code saving means for translating said code page and then saving the translation results in the process repository of said code page when said code page has not been translated.

In accordance with the method and means of the present invention, the permanent saving of translation results and reuse of the translation and optimization of the previously executed program can be achieved based on the recognized process. Consequently, the overall performance and efficiency of the full-system ISA emulator is increased, the overhead during the course of emulation is decreased, and code is optimized.

BRIEF DESCRIPTION OF THE DRAWINGS

As the present invention is better understood, other objects and effects of the present invention will become more apparent and easy to understand from the following description, taken in conjunction with the accompanying drawings wherein.

Like reference numerals designate the same, similar, or corresponding features or functions throughout the drawings.

DETAILED DESCRIPTION OF PREFERRED EMBODIMENTS

Referring to the accompanying drawings, the present invention will now be described in detail.

Figure 1:
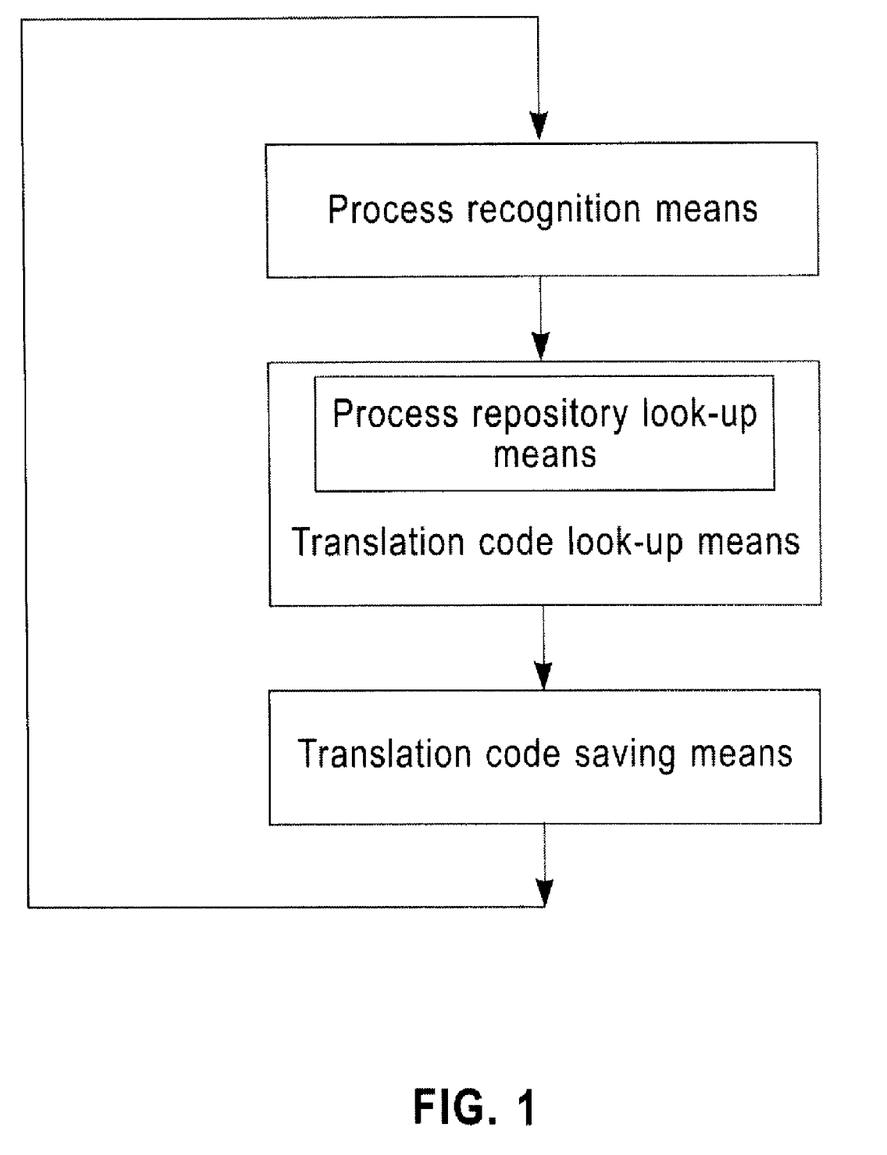
FIG. 1 depicts a block diagram of a device of saving content-based dynamic binary translation results according to the method of the present invention.

FIG. 1 depicts a block diagram of a device for saving content-based dynamic binary translation results according to the method of the present invention. This device includes a process recognition module, a translation code look-up module and a translation code saving module, among which the translation code look-up module optionally includes a process repository look-up module. Hereinafter, these modules will be described respectively.

Figure 2:
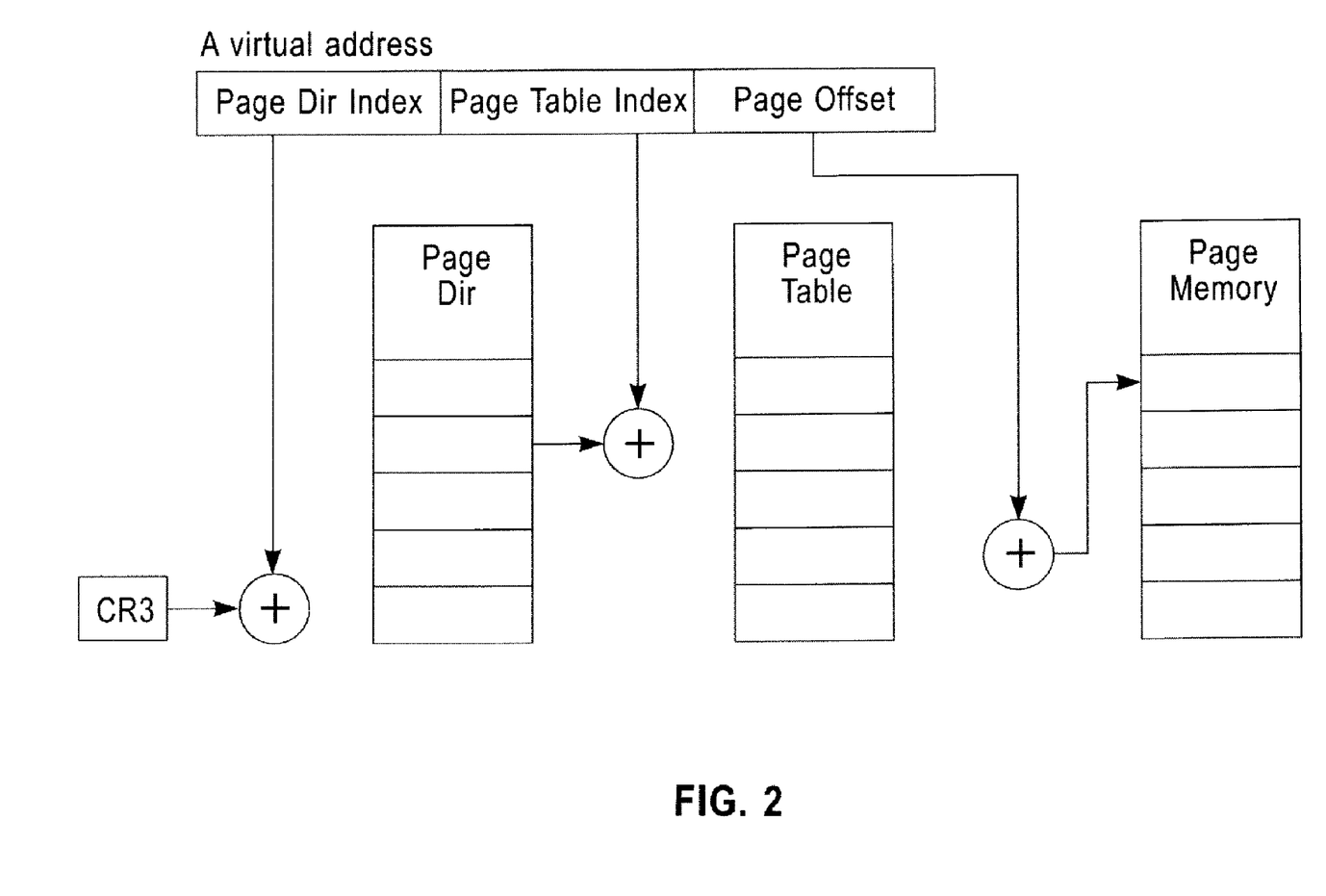
FIG. 2 is a schematic diagram of the process of mapping from virtual addresses to physical addresses in a modern architecture.

FIG. 2 illustrates the process of translation from virtual addresses to physical addresses in a modern architecture. In this modern architecture, there are some special registers pointing to the page table of a current process such as CR3 in x86, SDR1 in PowerPC. The changes of processes can be learned by monitoring the changes of these registers. Likewise, there must be a unique page table for each process, and a virtual address can be translated into a physical address via this page table in a full-system ISA emulator. Alternatively, the base address of this page table can be stored in a register similar to the above, and the process recognition module learns the switch between all processes by monitoring the register. For example, the beginning of a new process can be recognized when a new value of register has been found. When a process switch happens, this register must be changed to be fitted for the next coming process.

Figure 3:
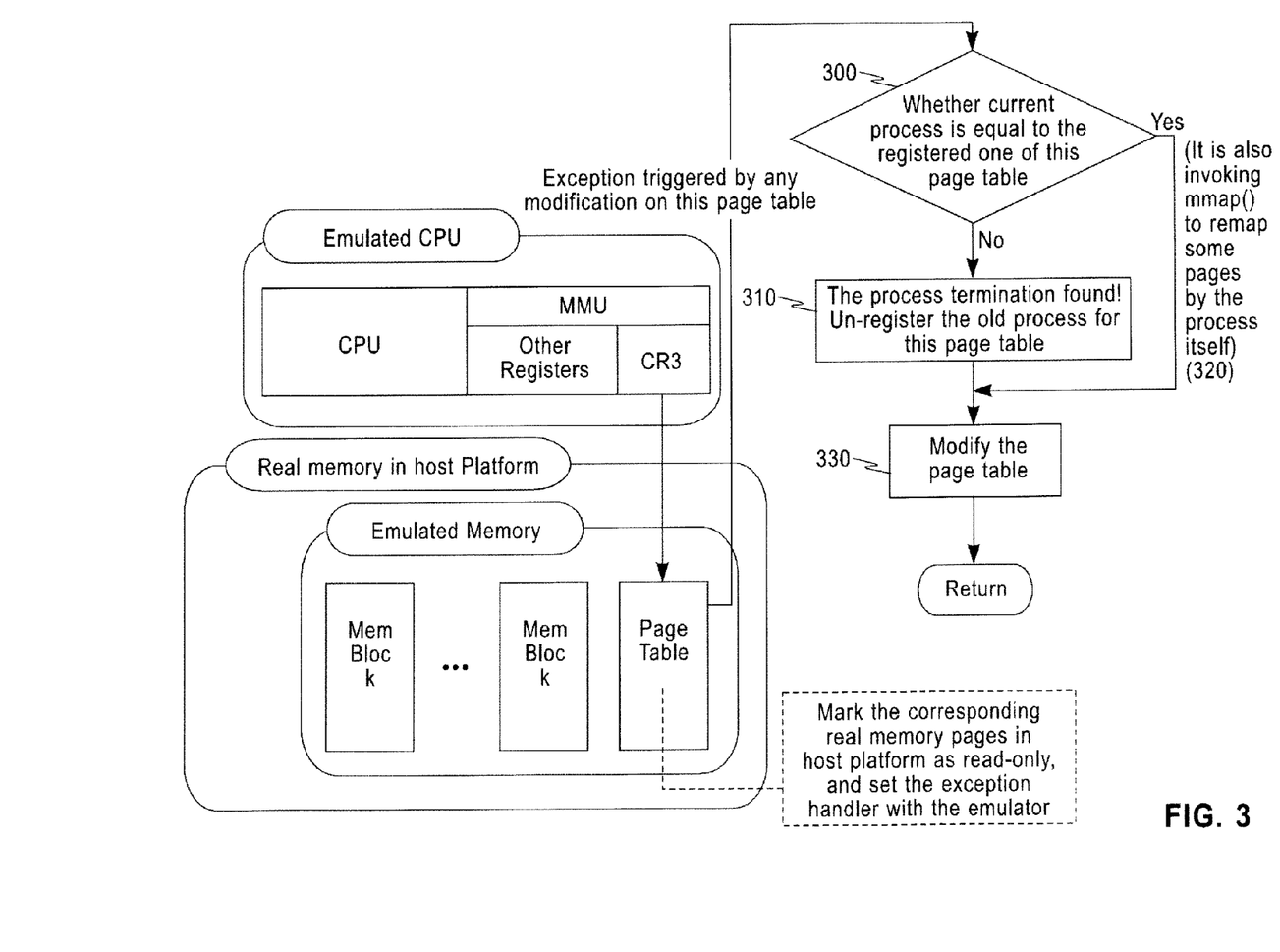
FIG. 3 depicts a flowchart of a method of recognizing a process according to the present invention.

FIG. 3 shows a flowchart of a method of recognizing a process according to the present invention. In the full-system ISA emulator, the CR3 register is pointing to the page table of the process, which is stored in a memory area, which is marked as read-only, used for emulation in the real memory area of the host platform. Alternatively, the page tables of all processes are registered in a process database by their CR3/SD1 values. Then, the full-system ISA emulator is employed to set an exception handler for the writing attempt to this area. The exception handler is triggered when any modification has been made to this page table. When an exception handler of attempting to modify the page table occurs, in step 300, the process recognition module determines if CR3 value of the current process is equal to the recorded CR3 value in this page table. If not, then it is determined in step 310 that the termination of the recorded process is recognized. The old process record for this page table is deregistered, including uninstalling the old process repository of the page table catalogue from the memory area. If yes, then it is determined that they are the same process, at which point the process may invoke function mmap ( ) to remap some pages. Subsequently, corresponding modifications are made to the page table and page catalogue in step 330.

Figure 4:
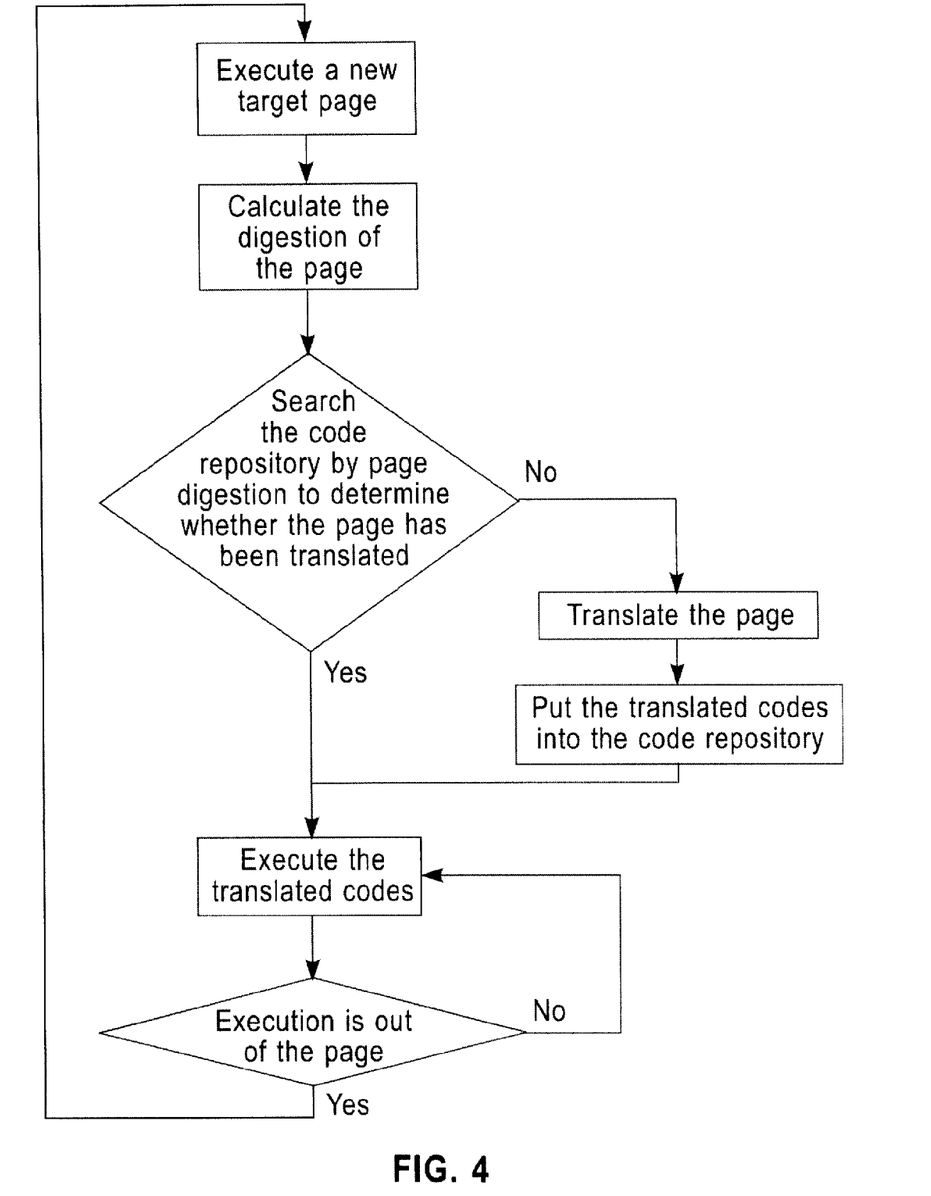
FIG. 4 depicts a flowchart of saving content-based dynamic binary translation without performing the process recognition in a full-system ISA emulator.

FIG. 4 depicts a flowchart of saving content-based dynamic binary translation without performing the process recognition and thus without distinguishing programs in the full-system ISA emulator. The corresponding steps will be briefly described hereinafter. When a new target code page is executed, first, the digestion of the code page is calculated; next, the determination is made if this code page has been translated by looking up the code page in the code repository through the digestion; if found, then the translated code is executed, otherwise, the code page is translated, the translated code is put into a code repository, and the translated code is executed. Since the process repository cannot be used to save the binary translation results indexed by content, the lookup in this huge code repository is particularly complicated.

Figure 5:
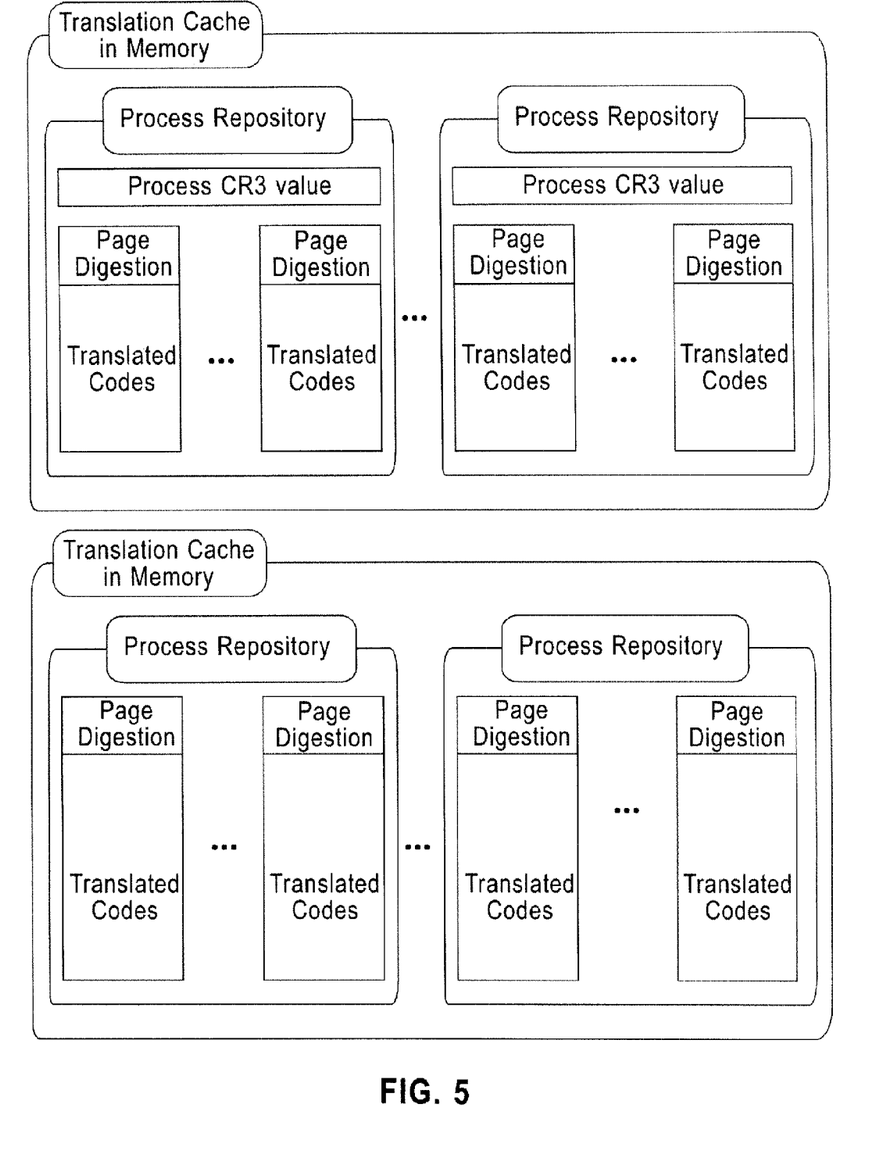
FIG. 5 is a schematic diagram of a translation cache organization according to the method of the present invention.

FIG. 5 depicts a schematic diagram of a translation cache organization according to the method of the present invention. According to the inventive method of recognizing a process in a full-system ISA emulator of the present invention, the translation cache in the host platform can be classified into two kinds: one is the fast cache in the memory area of the host platform and the other is the permanent cache in the memory disk of the host platform. As shown in the figure, there is a plurality of processes in the translation cache in the memory area (i.e., fast cache). Each process repository has a unique CR3 value to distinguish different processes. There is a plurality of translation codes that are distinguished from each other by the digestion in each process repository. Similarly, there is a plurality of process repositories in the permanent cache in the memory disk. The plural translation codes in each process repository are distinguished from each other by the digestion. The permanent cache is a superset of the fast cache. The translated code can only be executed directly on the fast cache. The process repository needs to be loaded from the permanent cache of the host platform to the fast cache when the process repository is executed for the first time.

Figure 6:
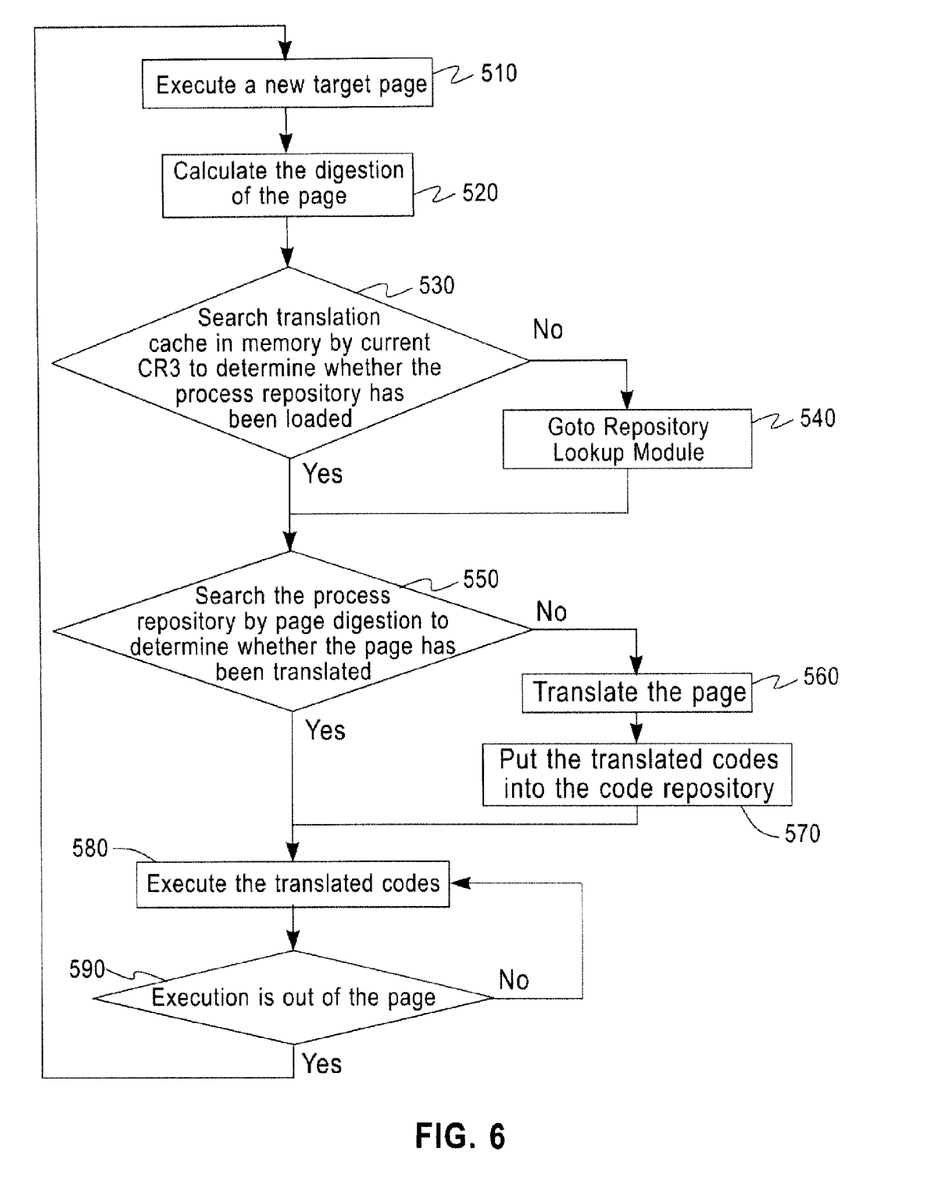
FIG. 6 depicts a flowchart of saving content-based dynamic binary translation according to the method of the present invention.

FIG. 6 depicts a flowchart of saving content-based dynamic binary translation according to the method of the present invention. The description will be made to FIG. 6 in conjunction with FIG. 1 hereinafter. The following steps will be performed in the translation code look-up module of FIG. 1, wherein the execution of a new code page is started in step 510. In step 520, the digestion of this code page is calculated by an abstract algorithm such as MD5. Then in step 530, a lookup is performed in the fast translation cache of the memory area of the host platform by using the CR3 value of the current process so as to determine whether the process repository has been loaded. If the process repository is not found in the fast translation cache, then the flow proceeds to step 540 in which the flow enters into the process repository look-up module. Otherwise, the flow proceeds to step 550 directly in which a lookup in the process repository is performed by using digestion so as to determine whether the code page has been translated. If not, the translation code saving module of FIG. 1 translates the code page in step 560.

Then the translated code is saved into the recognized process repository in step 570. The translated code is executed in step 580 and the determination as to whether the code page has been executed completely is made in step 590. If not, then the flow returns to step 580 for continuous execution. Otherwise, the flow returns to step 510 to continue to execute new code pages.

Figure 7:
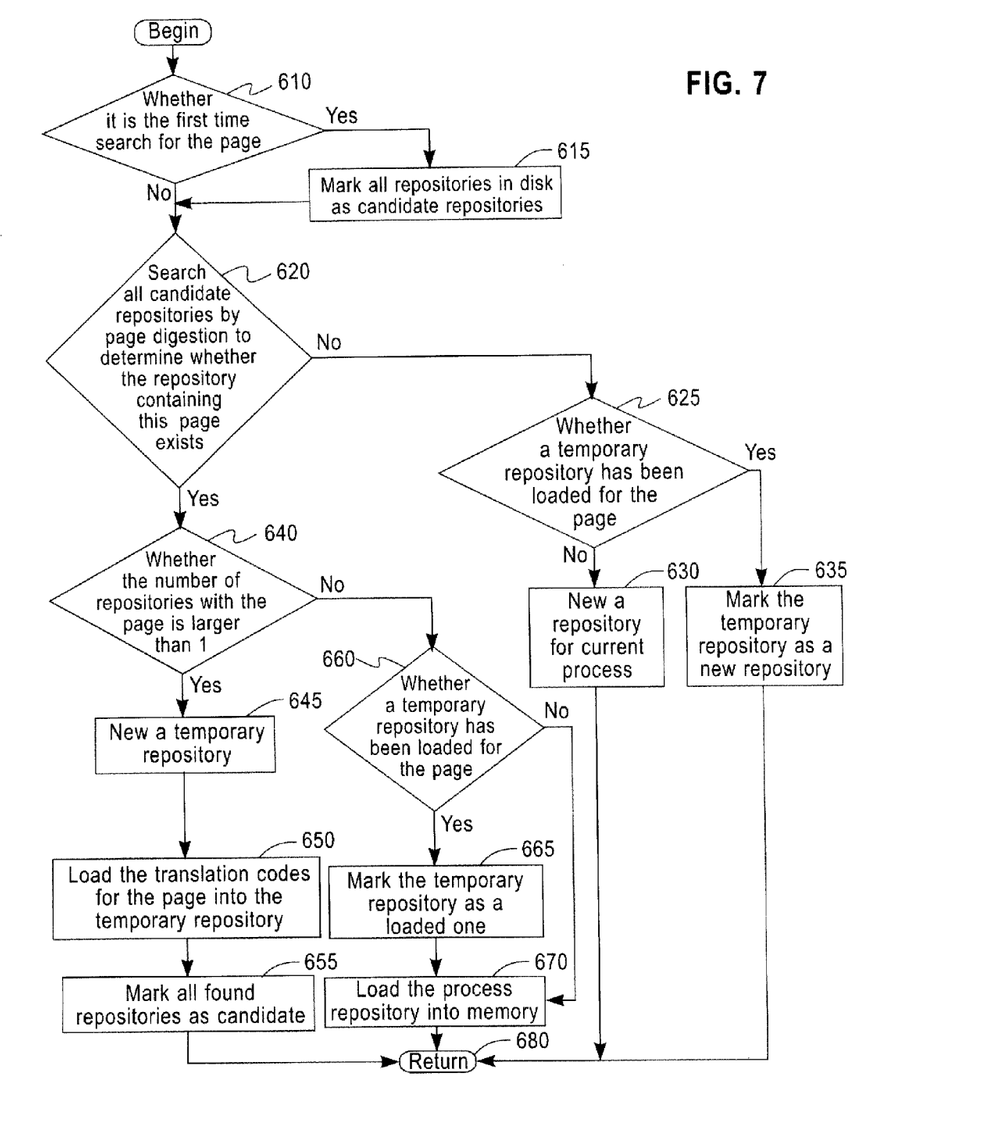
FIG. 7 depicts a flowchart in a process repository look-up module in FIG. 6.

FIG. 7 depicts a flowchart of the process repository look-up module in FIG. 6. The determination as to whether it is the first time to search for the code page is made in step 610. If yes, all process repositories in the memory disk are marked as candidate repositories in step 615. Otherwise, the flow proceeds to step 620 in which a lookup is performed in all candidate process repositories by using the digestion of the code page so as to determinate if there exists a process repository containing this code page. When such a process repository does not exist, the flow proceeds to step 625 in which whether a temporary process repository has been loaded for the code page is determined. If not, then a new code repository is created for the current process in step 630, and then the flow returns in step 680. If a temporary process repository has been created for this code page, this process repository is marked as new in step 635, and then the flow returns in step 680. If it is determined that there exists a process repository containing this code page at step 620, then whether the number of process repositories is more than 1 or not is determined at step 640. If the number is more than 1, then a new temporary repository is created at step 645 and the translation codes for the page are loaded into the temporary process repository. All the process repositories containing this code page are marked as candidate process repositories in step 655 so that a lookup can be performed directly in these candidate process repositories when the next code page is executed and thereby the efficiency of lookup is improved significantly. Then the flow returns in step 680. If it is determined that the number of such process repositories is equal to 1, then whether the temporary repository has been loaded for this code page is determined at step 660. If it has been loaded, then this temporary process repository will be marked as loaded one and loaded into the fast cache in step 670. The flow returns in step 680. If it is determined in step 660 that no temporary repository is loaded for this code page, then the found process repository is loaded into the fast cache. Then, the process repository look-up module proceeds to step 550 as shown in FIG. 6 in step 680.

It should be noted that the above description omits some more specific technical details which may be well-known to those skilled in the art and essential for implementing the present invention for the purpose of easy understanding.

The specification of the present invention has been presented for purposes of illustration and description, and is not intended to be exhaustive or limited to the invention in the form disclosed. Many modifications and variations will be apparent to those of ordinary skill in the art.

Therefore, the embodiments were chosen and described in order to best explain the principles of the invention, the practical application, and to enable others of ordinary skill in the art to understand that all modifications and alterations made without departing from the spirit of the present invention fall into the protection scope of the present invention as defined in the appended claims.

What is claimed is:

1. A method of recognizing a process in a full-system Instruction Set Architecture emulator, comprising the steps of:
    recognizing, by a processor of a computer system, a process based on a base address of a page table of the process;
    recognizing, by the processor, a switch between processes when the page table of the process is modified; and
    recognizing, by the processor, termination of a recorded process when a base address of a modified page table of the process is not equal to a base address of a page table of the recorded process;
    wherein the emulator saves content-based dynamic binary translation, the step of saving the content-based dynamic binary translation further comprising the steps of:
    performing, by the processor, a translation code lookup by calculating digestion of a code page and looking up a process repository of the code page to determine whether the code page has been translated based on the digestion;
    looking up, by the processor, the process repository in a fast translation cache of a memory of a host platform;
    saving, by the processor, translation code by translating the code page and saving translation results in the process repository by the emulator when the code page has not been translated, wherein: (i) the process repository is stored in the fast translation cache; (ii) the translation results are only executed from the fast translation cache; (iii) the process repository is further stored in a permanent translation cache of the memory of the host platform; and (iv) a process repository stored in the permanent translation cache is a superset of process repositories stored in the fast translation cache; and
    loading, by the processor, the process repository from the permanent translation cache to the fast translation cache if the process repository has not been found in the fast translation cache, wherein the step of loading the process repository further comprises the steps of:
    looking, by the processor, up the process repository in the permanent translation cache by the digestion of the code page;
    marking, by the processor, all of process repositories to be looked up in the permanent translation cache as candidate repositories and determining whether there is a candidate process repository containing the code page using the digestion of the code page;
    when there is no process repository containing the code page in the candidate repositories, creating, by the processor, a new process repository for the code page if no temporary process repository has been created for the code page, otherwise, marking the temporary process repository as a new process repository and then loading it to the fast translation cache;
    when there is more than one of the process repository containing the code page in the candidate repositories, creating, by the processor, the temporary process repository, loading the translation code to the temporary process repository thereby to be loaded to the fast translation cache, then marking all the process repositories containing the code page as the candidate repositories for subsequent code page; and
    when a number of process repositories containing code page is one, loading, by the processor, the process repository containing the code page to the fast translation cache.

2. The method according to claim 1, wherein the page table of said process is recorded in a process database by a value of the base address of the page table of said process.

3. The method according to claim 1, wherein said base address of the page table of the process is stored in a register and modifications of the page table of the process are determined by monitoring the register.

4. The method according to claim 1, wherein said page table is stored in the memory area of a host platform and the memory area is set as a read-only area, exception handler is set by using said emulator, and upon an attempt to modify said page table in said read-only area, the exception handler is triggered to recognize whether the process is terminated.

5. A full-system Instruction Set Architecture emulating system, comprising:
- means for process recognition for recognizing a process based on a base address of a page table of the process;
- means for recognizing a switch between processes when the page table the process is modified;
- means for recognizing a termination of a recorded process when a base address of a modified page table of the process is not equal to a base address of a page table of the recorded process;
- means for translation code look-up for calculating digestion of a code page, and looking up a process repository of the code page to determine whether it has been translated based on the digestion; and,
- means for translating saved code for translating the code page and then saving translation results in the process repository when the code page has not been translated;
- means for translation code look-up, wherein the means for translation code look-up is configured to:
- mark all process repositories to be looked up in a permanent translation cache of the memory of a host platform as candidate repositories, determining whether there is a candidate repository containing the code page by the digestion of the page;
- when there is no process repository containing the code page in the candidate repositories, create a new process repository for the code page if no temporary process repository has been created for the code page, otherwise, mark the temporary process repository as the new process repository and then load it to a fast translation cache of the memory of the host platform;
- when there is more than one of the process repository containing the code page in the candidate repositories, create the temporary process repository, load translation code to the temporary process repository to be loaded into a fast translation cache, then mark all process repositories containing the code page as the candidate repositories for subsequent code page; and
- when a number of process repositories containing the code page is one, load the process repository containing the code page to the fast translation cache; and
- means for process repository look-up for looking up the process repository in the permanent translation cache to load the process repository into the fast translation cache when the process repository has not been found in the fast translation cache, where: (i) the process repository in saved in the fast translation cache; (ii) the translation results are only executed from the fast translation cache; (iii) the process repository is also saved in a permanent translation cache; and (iv) process repositories saved in the permanent translation cache are superset of those saved in the fast translation cache.

6. The system according to claim 5, wherein said base address of the page table of the process is saved in a register and modifications of the page table of the process are determined by monitoring the register.

7. The system according to claim 5, wherein said page table is saved in the storage area of a host platform and the storage area is set as a read-only area, said process recognition means sets an exception handler, and upon an attempt to modify said page table in said read-only area, the exception handler is triggered to recognize whether the process is terminated.

8. A non-transitory computer readable storage medium tangibly embodying computer readable instructions which, when implemented, cause a computer to carry out the steps of a method comprising:
- recognizing, by the processor, a process based on a base address of a page table of the process;
- when the page table of the process is modified;
- recognizing, by the processor, termination of a recorded process when a base address of a modified page table of a process is not equal to a base address of a page table of the recorded process;
- wherein the emulator saves content-based dynamic binary translation, the step of saving the content-based dynamic binary translation further comprising the steps of:
- performing, by the processor, a translation code lookup by calculating digestion of a code page and looking up a process repository of the code page to determine whether the code page has been translated based on the digestion;
- looking up, by the processor, the process repository in a fast translation cache of a memory of a host platform;
- saving, by the processor, translation code by translating the code page and saving translation results in the process repository by the emulator when the code page has not been translated, where: (i) the process repository is stored in the fast translation cache; (ii) the translation results are only executed from the fast translation cache; (iii) the process repository is further stored in a permanent translation cache of the memory of the hose platform; and (iv) a process repository stored in the permanent translation cache is a superset of the process repositories store in the fast translation cache; and
- loading, by the processor, the process repository in the permanent translation cache to the fast translation cache if the process repository has not been found in the fast translation cache, wherein the step of loading the process repository further comprises the steps of:
- looking, by the processor, the process repository in the permanent translation cache by the digestion of the code page;
- marking, by the processor, all of process repositories to be looked up in the permanent cache as candidate repositories and determining whether there is a candidate process repository containing the code page using the digestion code page;
- when there is no process repository containing the code page in the candidate repositories, creating, by the processor, a new process repository for the code page if no temporary process repository has been created for the code page, otherwise, marking the temporary process repository as a new process repository and then loading it to the fast translation cache;
- when there is more than one of the process repository containing the code page in the candidate repositories, creating, by the processor, the temporary process repository, loading the translation code to the temporary process repository thereby to be loaded to the fast translation cache, then marking all the process repositories containing the code page as the candidate repositories for subsequent code page; and
- when a number of process repositories containing code page is one, loading, by the processor, the process repository containing the code page to the fast translation cache.

* * * * *